United States Patent Office 2,950,956
Patented Aug. 30, 1960

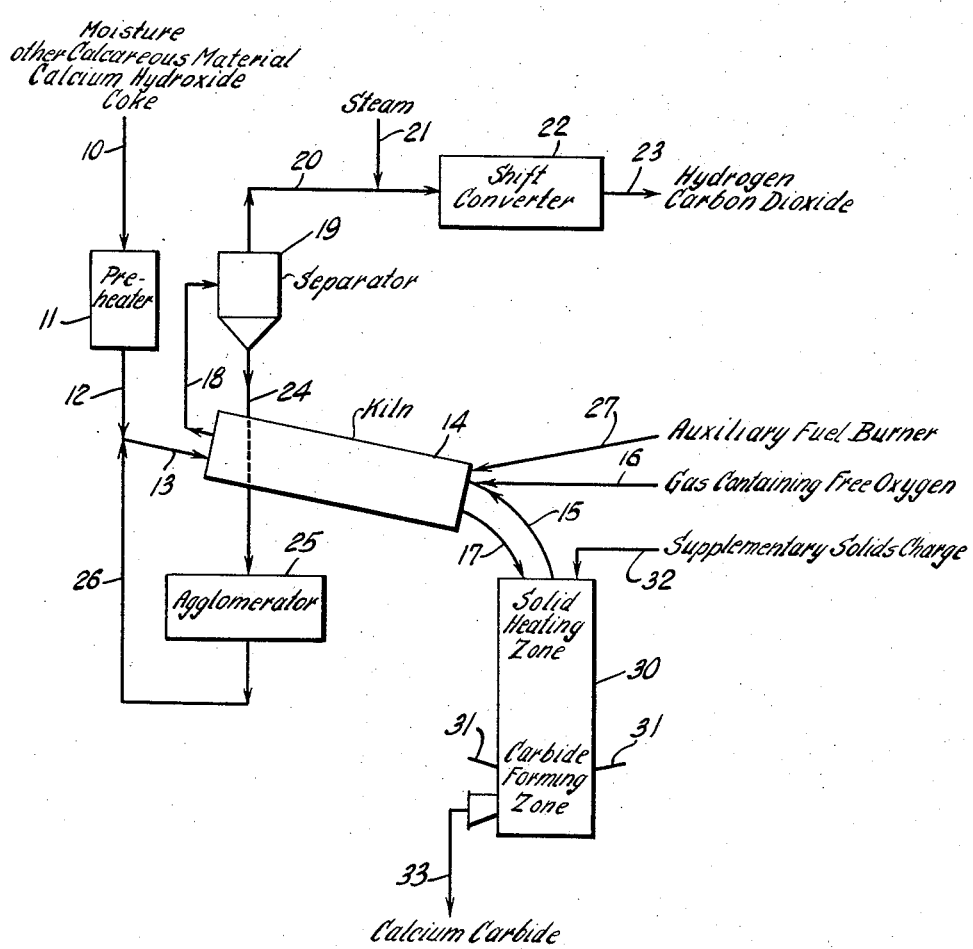

2,950,956

PROCESS FOR PRODUCTION OF CALCIUM CARBIDE AND HYDROGEN

John K. McKinley, Poughkeepsie, N.Y., Benjamin F. Smith, Groves, Tex., and Samuel P. Dickens, Poughkeepsie, N.Y., assignors to Texaco Inc., a corporation of Delaware Filed Mar. 27, 1957, Ser. No. 648,905

5 Claims. (Cl. 23—208)

This invention relates to a process for making calcium carbide and hydrogen, and more particularly to such process wherein calcareous material including calcium hydroxide is utilized.

Heretofore it has been the practice in preparing calcium carbide to heat coke and calcium oxide in an electric furnace. More recently it has been proposed to charge coke, charcoal, or anthracite coal and a calcareous compound such as unslaked lime, limestone, or dolomite into a shaft furnace which is fired with substantially pure oxygen to make the carbide. In either case molten carbide (containing a fluxing portion of alkaline earth metal oxide approximating 15–25% by weight of the finished goods) is withdrawn as the primary product and carbon monoxide gas is vented as a by-product.

In our process hydrated lime is used as an essential material with carbon. The conversion of lumps (e.g., 1″–6″ pieces) of hydrated lime into quicklime suitable for calcium carbide formation is done in a first heating zone together with substantial classification of the materials in process (fines and dust removal being accomplished) by means of a flow of carbon monoxide containing gas, at least part of which is supplied by the later calcium carbide-forming step. This helps to prevent undesirable packing and plugging in subsequent operations which can be highly deleterious. Concurrently with this classification and lime dehydration some of the carbon monoxide reacts with water expelled from the lime feed to form the valuable by-product, hydrogen, by the well-known water-gas shift reaction,

$$CO + H_2O \longrightarrow CO_2 + H_2$$
carbon  water  carbon  hydrogen
monoxide  dioxide In this first step the gas velocity should be sufficiently high for entraining the solid particles which are below about 60–70 mesh (U.S. standard) in size. The lime fed to this step should be heated therein to temperature between about 1075° F. and about 1500° F., and preferably to about 1200–1400° F. in order to convert it into calcium oxide. Apparatus useful in this step is a rotary kiln, a rotary dryer, a stationary kiln equipped with agitation means, of a cross-flow dryer. In this step, some quicklime, calcium carbonate, and/or dolomite can also be charged with calcium hydroxide, if desired, but calcium hydroxide feed is necessary to generate water for the shift reaction occurring. Advantageously at least part of the carboniferous charge for carbide production, e.g., coke or anthracite, is charged into this zone with the calcareous material and so preheated.

The hot solid particles of calcium oxide (and carbon if charged), freed of fines by the action of hot gases in the first step, are discharged into a second heating zone together with such supplementary solid carbon and/or quicklime pieces as are necessary for establishing a calcium oxide-carbon ratio suitable for production of calcium carbide. In the second heating zone the solids are further heated, incidentally to convert any residual calcium hydroxide into calcium oxide and principally to preheat this entire solid charge to as high a temperature as possible preparatory to forming calcium carbide therefrom. The preferred way of heating these solids is to pass the very hot by-product gas, raw carbon monoxide, from the carbide-forming zone through this second heating zone, e.g., the upper portion of a shaft furnace should one be used, or a feed reservoir when an electric furnace is used. Supplementary heating with a hot gas such as carbon monoxide or indirect heating by hot flue gases is also possible. The hot solids are then charged into a third heating zone, the carbide-forming zone, in conventional manner.

The invention can be better understood by reference to the drawing showing the preferred arrangement for our process.

Petroleum coke containing occluded calcium hydroxide, optionally admixed with coked coal, anthracite, and/or charcoal and supplementary calcium oxide, are charged into line 10 through preheater 11. Other calcareous material such as limestone or dolomite can also be charged here. Size of feed pieces should average above about 4″ or more, but fines need not be excluded as they are removed as hereinafter described. Moisture from conventional storage of these feed materials generally will be present. Accordingly, the preheater is operated to rid the feed of unbound moisture, and is operated at a solids discharge temperature of about 200–800° F. The feed can be deaerated, if desired, with a flow of flue gas (e.g., from line 20) to displace air from the preheater system.

The preheated feed, preferably proportioned to give a ratio of between about 1 and about 1.5 parts of resultant CaO per part of carbon for calcium carbide formation, is passed through conveyor 12 and 13 into kiln 14 along with recycled solids hereinafter described, from conveyor 26. Kiln 14 is equipped with rotating internal flights and is maintained with a temperature gradient from 1200–1500° F. on the solids at the solids discharge end (the lower end) to 700–1000° F. on the gases at the gas discharge end (the upper end). Ordinarily the sensible heat from the hot by-product carbon monoxide in line 15 is insufficient to maintain the kiln solids discharge temperature at the desired level. Accordingly, the additional heat is supplied to the kiln by bleeding a portion of the carbon monoxide from line 15 and burning it in a gas burner with a free oxygen-containing gas such as air or tonnage oxygen being fed from line 16.

Alternatively and preferably, the necessary additional heat at this stage is supplied to the kiln by an auxiliary fuel burner indicated by line 27. Advantageously this fuel burner is operated with air, oxygen-enriched air, or substantially pure oxygen (tonnage oxygen above 90% purity) and a coal, coke or hydrocarbon fuel so as to generate additional carbon monoxide and hydrogen, the temperature in such operation being above about 2500° F. In the case where such auxiliary fuel burner is operated with a hydrocarbon oil feed or a coke or coal feed it is necessary to add steam to the combustion process for most efficient operation, e.g., as shown in U.S. Patent 2,838,460, issued June 10, 1958, of William M. Stratford. When using a hydrocarbon gas feed such as natural gas, also shown in said patent application, the addition of such combustion steam is unnecessary. Free carbon from the combustion merely augments the feed to our system.

The superficial gas velocity in kiln 14 (input gas velocity as computed at average operating temperature and pressure for flow through the empty cross section of the kiln), should be sufficiently high to entrain solids finer than about 60–70 mesh and preferably particles even larger than this. Thus, the superficial gas velocity is at least about 5 feet per second, and is preferably between about 8 and about 15 feet per second. Average residence time of solids in the kiln should be sufficiently long to accomplish the preponderance of the slaked lime conversion into calcium oxide in the kiln rather than in the steps which follow. Pressure in the kiln is preferably slightly superatmospheric to preclude inward leakage of air.

Gases entraining fine particles are withdrawn from kiln 14 through line 18 and passed into separator 19, a centrifugal type whereby solid particles are collected in the bottom and fed through conduit 24 into agglomerator 25, for example, a briquetting machine, then recycled through conveyors 26 and 13 back to kiln 14. Gases vented from separator 19 are withdrawn through line 20, admixed with such steam (added through line 21) as is necessary to convert remaining carbon monoxide into hydrogen and carbon dioxide by the water-gas shift reaction and passed into catalytic shift converter 22.

Shift converter 22 is operated in conventional manner at temperature of about 750° F. utilizing the sensible heat of the gas feed. It uses a catalyst of iron oxide promoted with oxides of chromium, potassium, magnesium, and aluminum. The product gases issuing from shift converter 22 through line 23, consisting essentially of hydrogen and carbon dioxide, can be scrubbed free of carbon dioxide by conventional methods, e.g., with monoethanolamine, caustic soda, or potassium carbonate solution. The hydrogen, further purified, if necessary, can be used ultimately in the manufacture of ammonia, methanol, ore reduction, hydrogenation of oils, etc.

The hot solids from kiln 14 are discharged through conduit 17 into the top of shaft furnace 30, the upper part of the furnace providing a heating zone whereby escaping carbon monoxide from the carbide-forming reaction further heats the input solids and is withdrawn through line 15. At this point supplementary carbon, e.g., coke, and supplementary calcium oxide, calcium carbonate and/or dolomite, can be charged to the shaft furnace through line 32 for operating the furnace at capacity in case of interruption of feed from the kiln or for adjusting the CaO:C ratio in the furnace feed to a desired value. Tonnage oxygen is fed into a ring of tuyeres annularly disposed around the furnace near its base and indicated in the drawing by items 31. Advantageously, the oxygen tuyeres and molten carbide zone are arranged as shown in U.S. Patent 2,738,256 of March 13, 1956. Molten calcium carbide is tapped from the furnace and withdrawn as indicated by flow line 33. Alternatively one or more conventional "closed" electric furnaces can be used in place of the shaft furnace. Temperature of operation in either case must be very high, i.e., in excess of about 3500° F., for the carbide-forming step.

Calcium carbide reacting with water generates acetylene and hydrated lime. Where the acetylene is being generated on a large scale, it is frequently advantageous to use a semi-dry or a "dry" process as, for example, is shown in U.S. Patent 2,343,185 or 2,415,328. The hydrated lime made by such process is excellent feed for the process of our invention; it need not be wastefully discharged into waste dumps or the like even if it is higher in free moisture than is ordinarily marketable. Alternatively, calcium carbide can be converted into acetylene and hydrated lime, and the lime further processed with residual oil or the like to form a calcium hydroxide-bearing coke by use of the process such as the one shown in U.S. Patent 2,944,960, issued July 12, 1960. Petroleum coke containing calcium hydroxide as made by this process is the preferred feed to our kiln.

*Example*

136 parts by weight of petroleum coke granules, preponderantly ¼–½" mesh in size and occluding 48.5% by weight of calcium hydroxide, and 50 parts by weight of calcium oxide of about the same particle size are preheated to 950° F. with combustion gases, then further heated to 1150° F. by flowing hot carbon monoxide therethrough at a velocity of about 8 feet per second. Accordingly, calcium hydroxide is converted into calcium oxide, the granules are rid of dust and fines, and the water vapor picked up by the carbon monoxide initiates shift conversion thereof into hydrogen and carbon dioxide. The resulting pieces are then heated in an induction furnace to a temperature in excess of about 2000° C. for about 30 minutes. The cooled product comprises a technical grade of calcium carbide.

In place of the calcium oxide used above 66 parts by weight of calcium hydroxide pellets can be used.

We claim:

1. A process for making calcium carbide and hydrogen which comprises: heating calcareous material including calcium hydroxide in one heating zone to a temperature between about 1075° F. and about 1500° F. in the presence of a stream of carbon monoxide-containing gas flowing through said one heating zone at a velocity at least sufficiently high for entraining solid particles which are substantially below approximately 60–70 mesh size, said stream comprising carbon monoxide-containing vent gas from another heating zone of the process, thereby dehydrating at least a portion of said calcium hydroxide to calcium oxide and additionally removing fine solid particles from said one heating zone while catalytically converting at an elevated temperature some of the generated steam in the presence of said carbon monoxide into hydrogen with concomitant formation of carbon dioxide; withdrawing resulting gases, vapors, and entrained solid particles as one product stream for said catalytic conversion and remaining solids as another product stream from said one heating zone; passing said remaining solids into another heating zone together with additional solid carbon and therein contacting said remaining solids and solid carbon in direct heat exchange with a flow of a by-product carbon monoxide from a calcium carbide formation stage of the process, thereby further heating said remaining solids and solid carbon and converting residual calcium hydroxide into calcium oxide; venting the resulting carbon monoxide flow of reduced heat content from said another heating zone and passing it as said vent gas into said one heating zone; passing the further heated solids consisting essentially of calcium oxide and carbon into said calcium carbide formation stage maintained at a temperature in excess of about 2500° F. and whereby calcium carbide and by-product carbon monoxide are formed; passing by-product carbon monoxide into said another heating zone; and withdrawing calcium carbide from said furnace zone.

2. The process of claim 1 wherein supplementary heat for said one heating zone is provided by combustion of a portion of said resulting carbon monoxide flow being vented from said another heating zone with a gas containing free oxygen.

3. The process of claim 1 wherein supplementary heat for said one heating zone is provided by combustion of an extraneous carbonaceous fuel with a gas containing free oxygen.

4. The process of claim 3 wherein the combustion of said extraneous carbonaceous fuel is carried out at a temperature in excess of about 2500° F. and under conditions for generating additional carbon monoxide.

5. A process for concurrently making calcium carbide and hydrogen which comprises: heating calcareous material including calcium hydroxide in a first heating zone to a temperature between 1075 and 1500° F. in the presence of carbon monoxide, thereby converting calcium hydroxide to fine and coarse particles comprising calcium oxide and also forming steam; passing said coarse particles comprising calcium oxide into a second heating zone together with particles of solid carbon and heating said particles therein, thereby converting residual calcium hydroxide into calcium oxide; passing the solid particles from said second heating zone into a third heating zone and converting said particles to calcium carbide by subjecting them to a temperature above 3500° F., while concurrently generating hot carbon monoxide; passing said hot carbon monoxide through said second heating zone in direct heat exchange relationship with the solid particles therein to heat said solid particles; passing said hot carbon monoxide from said second heating into and through said first heating zone as a stream flowing at a velocity sufficiently high for entraining said fine particles comprising calcium oxide; passing said carbon monoxide, the so entrained fine particles, and said stream out of said first heating zone; and catalytically reacting said carbon monoxide and said steam with one another at a superatmospheric temperature in a shift conversion zone to form hydrogen and carbon dioxide.

References Cited in the file of this patent

UNITED STATES PATENTS

| | | |
|---|---|---|
| 1,173,417 | Ellis | Feb. 29, 1916 |
| 2,380,008 | Abrams et al. | July 10, 1945 |
| 2,674,581 | Balcar et al. | Apr. 6, 1954 |

UNITED STATES PATENT OFFICE
CERTIFICATE OF CORRECTION

Patent No. 2,950,956                  August 30, 1960

John K. McKinley et al.

It is hereby certified that error appears in the printed specification of the above numbered patent requiring correction and that the said Letters Patent should read as corrected below.

Column 4, line 48, for "2500° F." read -- 3500° F. --.

Signed and sealed this 4th day of April 1961.

(SEAL)
Attest: ERNEST W. SWIDER
Attesting Officer

ARTHUR W. CROCKER
Acting Commissioner of Patents